United States Patent
Das et al.

(10) Patent No.: US 9,773,083 B1
(45) Date of Patent: Sep. 26, 2017

(54) POST-PLACEMENT AND PRE-ROUTING PROCESSING OF CRITICAL PATHS IN A CIRCUIT DESIGN

(71) Applicant: Xilinx, Inc., San Jose, CA (US)

(72) Inventors: Sabyasachi Das, San Jose, CA (US); Zhiyong Wang, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/069,598

(22) Filed: Mar. 14, 2016

(51) Int. Cl.
*G06F 17/50* (2006.01)

(52) U.S. Cl.
CPC ........ *G06F 17/505* (2013.01); *G06F 17/5072* (2013.01); *G06F 17/5077* (2013.01)

(58) Field of Classification Search
CPC ............. G06F 2217/84; G06F 17/5054; G06F 17/5072; G06F 17/5031; G06F 17/5077; G06F 17/505; G06F 17/5081; G06F 2217/06
See application file for complete search history.

(56) References Cited

U.S. PATENT DOCUMENTS

| | | | | |
|---|---|---|---|---|
| 8,091,057 B1* | 1/2012 | Suthar | ................ | G06F 17/5031 703/14 |
| 8,196,081 B1* | 6/2012 | Arslan | ................ | G06F 17/5072 703/14 |
| 8,677,298 B1* | 3/2014 | Manohararajah | ... | G06F 17/5054 716/116 |
| 8,893,071 B1* | 11/2014 | Gaide | ................ | G06F 17/5054 716/113 |
| 8,984,462 B1* | 3/2015 | Das | ................... | G06F 17/5054 716/113 |
| 9,235,660 B1 | 1/2016 | Lu et al. | | |
| 2005/0034091 A1* | 2/2005 | Harn | ................... | G06F 17/5072 716/113 |
| 2008/0216038 A1* | 9/2008 | Bose | ................... | G06F 17/5072 716/118 |

(Continued)

OTHER PUBLICATIONS

Altera, Quartus II Handbook Version 13.1, vol. 2: Design Implementation and Optimization, QII52007-13.1.0, Nov. 2013, Chapter 16, pp. 16-1 to 16-16, Altera Corporation, San Jose, California, USA.

(Continued)

*Primary Examiner* — Nha Nguyen
(74) *Attorney, Agent, or Firm* — LeRoy D. Maunu

(57) ABSTRACT

Aspects of processing a circuit design include synthesizing the circuit design and placing elements of the synthesized circuit design. After placing and before routing, respective delay values and slacks are determined. A first path having a most negative slack is determined and a first group of candidate paths is selected. The first group of candidate paths is a subset of critical paths of the circuit design, and the first group of candidate paths have delay values within a threshold range of delay values from the delay value of the first path. The first group of candidate paths are modified to reduce the respective delay values and a second group of candidate paths is selected. The second group of candidate paths have circuit structures that match selected circuit structures and are modified to reduce the respective delay values. A critical path having a most negative slack is iteratively selected and modified to reduce the respective delay value.

20 Claims, 5 Drawing Sheets

(56) References Cited

U.S. PATENT DOCUMENTS

2012/0102448 A1* 4/2012 Haugestuen ........ G06F 17/5036
716/134
2016/0371403 A1* 12/2016 Sinnadurai .......... G06F 17/5081

OTHER PUBLICATIONS

Altera, Quartus II Handbook Version 13.1, vol. 2: Design Implementation and Optimization, QII52005-13.1.0, Nov. 2013, Chapter 12, pp. 12-1 to 12-46, Altera Corporation, San Jose, California, USA.

Chen, Wei et al., "Simultaneous Gate Sizing and Placement," IEEE Transactions on Computer-Aided Design of Integrated Circuits and Systems, Feb. 2000, pp. 206-214, vol. 19, No. 2, IEEE, Piscataway, New Jersey, USA.

Lee, Chee Sing et al., "Fast and Accurate Interval-Based Timing Estimator for Variabiity-Aware FPGA Physical Synthesis Tools," Proc. of the 2007 International Conferernce on Field Programmable Logic and Applications, Aug. 27, 2007, pp. 279-284, IEEE, Piscataway, New Jersey, USA.

Singh, Deshanand P. et al., "Two-Stage Physical Synthesis for FPGAs," Proc. of the IEEE 2005 Custom Integrated Circuits Conference, Sep. 18, 2005, pp. 171-178, IEEE, Piscataway, New Jersey, USA.

Synopsis, Synplify Premier, The Ultimate FPGA Implementation Platform, Jan. 1, 2011, Synopsis, Inc., Mountain View, California, USA.

Ye, Terry Tao, "Physical Synthesis for ASIC Datapath Circuits," Proc. of the 2002 International Symposium on Circuits and Systems, May 26, 2002, pp. 111-365 to 111-368, vol. 3, IEEE, Piscataway, New Jersey, USA.

Alpert, Charles J., "The Coming of Age of Physical Synthesis," Proc. of the 2007 IEEE/ACM International Conference on Computer-Aided Design, Nov. 5, 2007, pp. 246-249, IEEE, Piscataway, New Jersey, USA.

Xilinx, "Timing Constraints User Guide," UG612 (v 11.1.1), Apr. 29, 2009, pp. 1-142, Xilinx, Inc., San Jose, California, USA.

* cited by examiner

POST-PLACEMENT AND PRE-ROUTING PROCESSING OF CRITICAL PATHS IN A CIRCUIT DESIGN

TECHNICAL FIELD

The disclosure generally relates to addressing timing violations in a placed circuit design prior to routing.

BACKGROUND

In order to implement a circuit design within an integrated circuit (IC) such as a programmable IC or an application specific integrated circuit (ASIC), the circuit design undergoes processes including synthesis, mapping, placement, and routing. Synthesis refers to the process of converting, or translating, an abstract, programmatic description of a circuit specified in a hardware description language (HDL) into a low-level design implementation. The abstract, programmatic description of the circuit describes the behavior of the circuit and is also referred to as a "behavioral description" or a "register transfer level (RTL) description" of the circuit. The low level design implementation generated through synthesis typically is specified as inter-connected logic gates.

Once synthesized, the resulting low-level circuit implementation is mapped. Mapping is the process of correlating, or matching, the logic gates of the low-level circuit design to the various types of circuit blocks or resources that are actually available in the particular IC in which the circuit design is to be implemented, i.e., the "target IC." For example, since a lookup table (LUT) may implement a complex function, one or more logic gates of the low level design implementation may be mapped to a single LUT, or other programmable tile of the target IC. The mapped circuit design specifies the same functionality as the low level design implementation, albeit in terms of the particular circuit blocks available on the target IC as opposed to low-level logic gates.

Placement is the process of assigning elements of the mapped circuit design to particular instances of circuit blocks and/or resources having specific locations on the target IC. Once placed, an element of the circuit design has a specific location on the target IC as opposed to only being assigned to a particular type of circuit block and/or resource as is the case after mapping and prior to placement. The location of the instance of the circuit block and/or resource on the target IC assigned to an element of the circuit design is the location of that element when placed. Routing is the process of selecting particular routing resources to electrically couple the various circuit blocks of the target IC. In a programmable IC, the routing resources may include wires, programmable interconnection points (PIPs) and/or other interconnect circuitry.

Circuit designs may be evaluated against requirements set forth in a design specification after various stages of the design flow described above. Estimates of circuit design performance relating to timing, power consumption, or the like, may be compared with the requirements of the design specification to determine whether the requirements are met. Aggressive timing requirements pose challenges for implementing circuit designs, whether on programmable ICs or on ASICs. For some circuit designs, tools for implementing the circuit design may require lengthy computation times to determine a feasible placement and satisfy timing requirements, as a programmable IC has a finite number of logic and interconnect resources, and an ASIC has a limited amount of die area on which to implement a circuit design. Examples of programmable ICs include field programmable gate arrays (FPGAs) and systems on chip (SOCs) having a combination of hardwired processors, programmable logic, and memory.

SUMMARY

A disclosed method of processing a circuit design includes performing operations by a processor that is coupled to a memory having a stored circuit design. The operations performed by the processor include synthesizing the circuit design and placing elements of the synthesized circuit design at locations on a target IC. After placing and before routing the circuit design, further operations performed by the processor include determining respective delay values and slacks for paths across all timing-groups present in the circuit design. The processor determines a first path of the circuit design having a most negative slack and selects a first group of candidate paths from paths of the circuit design. The first group of candidate paths is a subset of critical paths of the circuit design, and the first group of candidate paths have delay values within a threshold range of delay values from the delay value of the first path. The processor modifies the first group of candidate paths to reduce the respective delay values of the first group of candidate paths and selects a second group of candidate paths from the paths of the circuit design. The second group of candidate paths is a subset of paths of the circuit design having circuit structures that match selected circuit structures. The processor modifies the second group of candidate paths to reduce the respective delay values and iteratively selects a critical path having a most negative slack and modifying the critical path to reduce the respective delay value.

Another disclosed method of processing a circuit design includes performing operations by a processor that is coupled to a memory having a stored circuit design. The operations include synthesizing the circuit design and placing elements of the synthesized circuit design at locations on a target IC. After the placing and before routing the circuit design, physical synthesis operations are performed. The physical synthesis operations include determining respective delay values and slacks for paths in the circuit design and selecting a subset of the paths of the circuit design having a shared set of timing constraints. The physical synthesis operations further include determining a first path having a most negative slack in the subset of paths and selecting a first group of candidate paths from the subset of paths. The first group of candidate paths is a subset of the subset of paths of the circuit design, and the first group of candidate paths have delay values within a threshold range of delay values from the delay value of the first path. The physical synthesis operations modify the first group of candidate paths to reduce the respective delay values of the first group of candidate paths. A second group of candidate paths is selected from the subset of paths of the circuit design. The second group of candidate paths is a subset of the subset of paths of the circuit design having circuit structures that match selected circuit structures. The physical synthesis operations further include modifying the second group of candidate paths to reduce the respective delay values and iteratively selecting a critical path having a most negative slack and modifying the critical path to reduce the respective delay value. The physical synthesis operations are repeated for different subsets of the paths of the circuit design having shared sets of timing constraints, respectively.

A disclosed system for processing a circuit design includes a processor and a memory coupled to the processor. The memory is configured with instructions that when executed by the processor, cause the processor to perform operations including synthesizing the circuit design and placing elements of the synthesized circuit design at locations on a target IC. After the placing and before routing the circuit design, the instructions cause the processor to determine respective delay values and slacks for paths in the circuit design and determine a first path of the circuit design having a most negative slack. The instructions further cause the processor to select a first group of candidate paths from paths of the circuit design. The first group of candidate paths is a subset of critical paths of the circuit design, and the first group of candidate paths have delay values within a threshold range of delay values from the delay value of the first path. The instructions cause the processor to modify the first group of candidate paths to reduce the respective delay values of the first group of candidate paths and to select a second group of candidate paths from the paths of the circuit design. The second group of candidate paths is a subset of paths of the circuit design having circuit structures that match selected circuit structures. The instructions further cause the processor to modify the second group of candidate paths to reduce the respective delay values and iteratively select a critical path having a most negative slack and modify the critical path to reduce the respective delay value.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
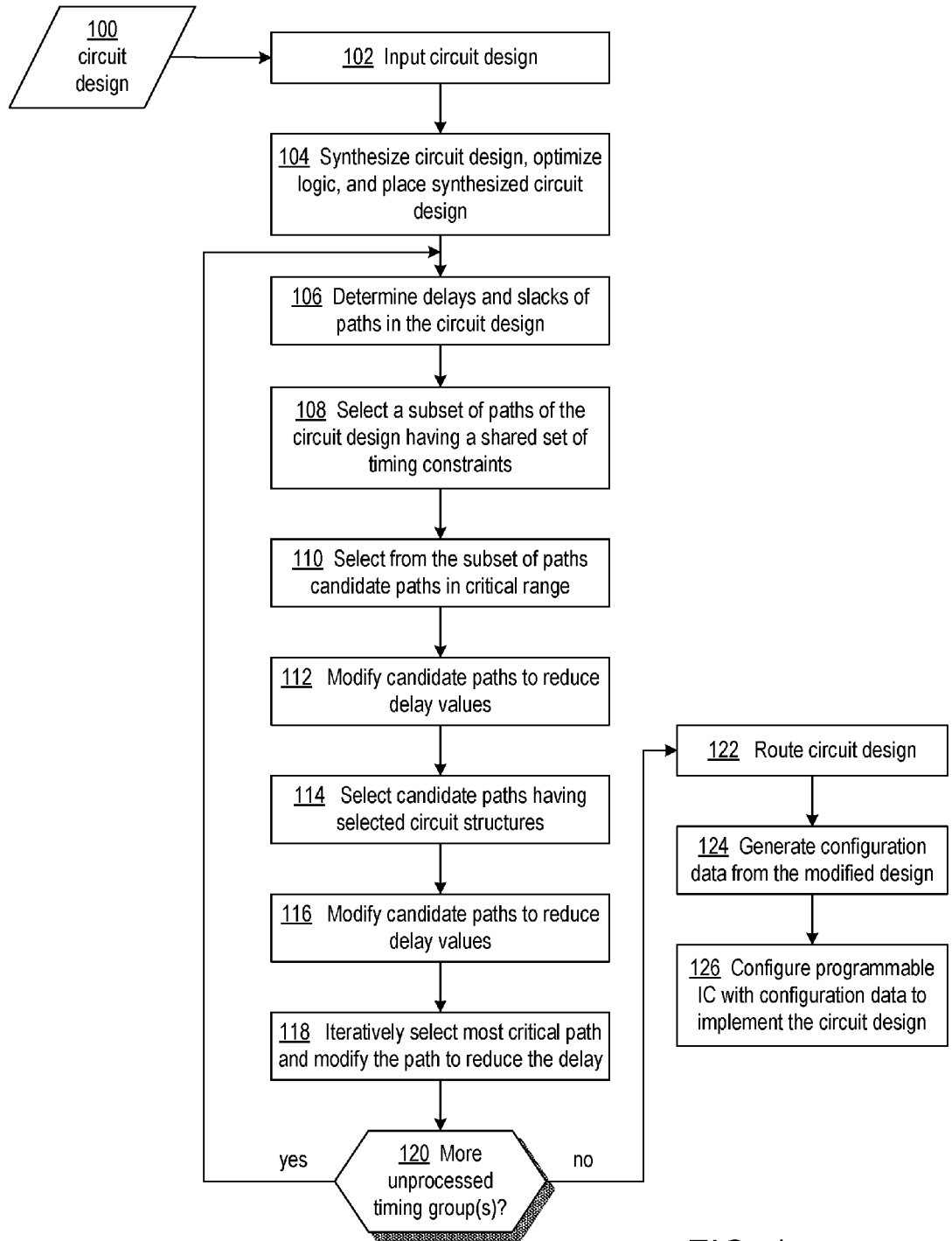
FIG. 1 shows a flowchart of a process for reducing timing delays in paths in a placed, but un-routed circuit design.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems provide approaches for modifying a placed, un-routed circuit design in order to move the circuit design nearer to satisfying timing requirements. That is, after the circuit design has been placed and before the circuit design has been routed, various optimization techniques are applied to selected parts of the circuit design. The timing profile of a placed but un-routed circuit design is completely estimated with an expectation that estimated delay numbers are somewhat similar to the actual delay numbers. The placement of circuit design elements helps the estimation engine to estimate the timing information with reasonable accuracy. However, as the circuit design is un-routed, timing information is completely estimated for signal routes. The disclosed approaches avoid lengthy runtimes and creating congestion that may interfere with timing closure by selecting different subsets of paths of the circuit design in different phases and applying different optimization techniques in the different phases. Aggressively selecting candidate paths in multiple phases may improve quality of results (QoR) of the placed and routed circuit design.

A "critical path," generally refers to a signal path that does not meet a timing requirement. The criticality of a path can be measured by the "slack" of the path. Slack refers to the difference between the time a signal is expected to arrive at a particular destination (required time) to meet established design constraints and the actual time, or estimated time as determined by the design tool, at which the signal arrives (arrival time). The more negative the slack, the more critical the path. The path having the worst negative slack (least of the slack values) is the most critical path.

In the disclosed approaches, a processor performs various optimizations on selected paths of a placed circuit design in multiple stages or phases. After the circuit design has been placed and before the circuit design has been routed, the processor determines delays and slacks of paths of the circuit design. In a first phase, the processor determines the delay of the most critical path and selects a group of critical paths having delays within a threshold range of the delay of the most critical path. The processor modifies the selected group of paths to reduce delays of the paths by performing an optimization method on the selected group of paths. In one implementation, the first phase may be repeated, selecting a new group of candidate paths and applying a different optimization method in each iteration.

In a second phase, the processor selects another group of candidate paths from the circuit design. The selection of the second group of candidate paths is based on paths in the circuit design having circuit structures that match one or more selected circuit structures. Different optimization methods may be applied to different circuit structures. Thus, the second group of candidate paths may include a number of sub-groups, with the candidate paths in each sub-group matching one of the circuit structures. The processor modifies the paths to reduce the delays in the second group of candidate paths according to the optimization method associated with each of the different circuit structures.

In the third phase, the processor iteratively selects the most critical path and modifies the critical path using an optimization method to reduce the delay. This approach is iteratively done across all clock-groups (path groups) present in the design. Once the most critical path in any path group can no longer be improved, the third phase is complete.

The disclosed approaches may improve the QoR of the placed and routed circuit design. The QoR of a circuit design may include such factors as area and speed of the implemented circuit design, as well as power dissipation, power efficiency, routing overhead and other factors known to those skilled in the art. The disclosed approaches may be paired with generally available or proprietary electronic design automation (EDA) tools that provide synthesis, place-and-route, timing analysis, and optimization functions.

FIG. 1 shows a flowchart of a process for reducing timing delays in paths in a circuit design 100. A processor inputs the circuit design at block 102. The circuit design may be specified in a hardware description language (HDL), high-level programming language, or schematic capture, for example. At block 104, the processor executes circuit design tools and synthesizes, optimizes logic, and places the circuit design, the result of which is stored in a memory, such as DRAM, SRAM, or magnetic media.

At block 106, the processor determines delays and slacks of paths in the placed circuit design. Each path of the placed circuit design will have associated therewith a first value indicating the delay of the path and a second value indicating the slack of the path. The delay and/or slack values may be determined and provided by a conventional timing tool given characterized circuit features of a target device and the known durations of clock cycles of the paths, where: delay of a path=duration of a clock cycle for the path−slack of the path.

The paths of the circuit design may be processed according to timing groups. For example, a subset of paths of the circuit design may share a set of timing constraints, and different subsets of paths of the circuit design may have different sets of timing constraints. Timing constraints are known to those skilled in the art and specific examples are described in the Timing Constraints User Guide (Xilinx, Inc., 2009). In an example implementation, the groups of paths having shared sets of timing constraints are processed one group at a time. At block 108, a subset of paths having a shared set of timing constraints is selected for physical synthesis. The shared set of timing constraints includes one or more timing constraints that apply to all the paths in the subset. The subset of paths may also be referred to herein as a "timing group."

In the first phase of optimizing the placed circuit design, at block 110 the processor selects from the subset/timing group of paths, a group of candidate paths for optimization based on the delay of the most critical path and delays of other critical paths in the subset/timing group. The first phase of processing generally entails applying selected optimization methods on critical paths within a critical range of the most critical path. In one implementation, the group of candidate paths includes the most critical path and other critical paths having delays within a threshold range from the most critical path. For example, the group of candidate paths may include critical paths having delays within X % of the delay of the most critical path of the subset/timing group, where X may be chosen by the user. A smaller value would result in the selection of fewer paths and reduced processing time, and larger value would result in the selection of more paths and increased processing time.

At block 112, the candidate paths are modified and delays reduced by performing optimization methods on the paths. In one implementation, the processor repeats the operations of blocks 110 and 112, selecting a new group of candidate paths from the subset/timing group and performing a different optimization method in each iteration. As not every one of the candidate paths will have the same circuit characteristics, not every candidate path would be modified using the chosen optimization method in each iteration. For example, rewire optimization may be performed in one iteration, and fanout optimization may be performed in another iteration.

Once all the desired optimization methods have been applied to the groups of candidate paths in the critical range, a second phase of optimization commences at block 114. In the second phase of optimization, the selected candidate paths need not be in a critical range. Instead, the candidate paths are selected from the subset/timing group based on the specified circuit structure. At block 114, the processor selects from the subset/timing group, candidate paths having circuit structures that match selected criteria. For example, a path may be selected as a candidate path if the path has a high fanout, that is, a fanout greater than a threshold fanout value. In another example, a path may be selected as a candidate path if the path has a LUT-depth greater than a LUT-depth threshold. The LUT-depth of a path is the number of LUTs that are serially/sequentially connected in the path. A path that includes a digital signal processor (DSP) or block RAM (BRAM) may be identified as a candidate path if an input or the output of the DSP or BRAM is on a critical path.

At block 116, the processor modifies the candidate paths and reduces delays in the selected group by performing the optimization methods appropriate for the different types of candidate paths. The second phase of optimization is complete after performing the operations of block 116.

The third optimization phase is performed at block 118. At block 118, the processor iteratively selects the most critical path in the circuit design and performs an optimization method on the path to reduce the delay. In an example implementation, a greedy optimization technique may be applied to the selected path. If the selected path is improved, the design is updated with the improved path, the timing of the circuit design is re-analyzed, and a new most critical path is selected for optimization. The third phase is complete once the delay of the selected path cannot be reduced.

Decision block 120 determines whether or not all timing groups have been processed. If another timing group remains to be physically synthesized, the process returns to block 106, where the delays and slacks of paths of the circuit design are determined, and an unprocessed timing group is selected at block 108 for physical synthesis. Once physical synthesis has been performed for the paths in all the timing groups, the process is directed to block 122.

After the three phases of post-placement optimization are complete, at block 122, the processor executes a routing tool that routes the circuit design. The routing of the circuit design may include further optimization of paths of the circuit design to satisfy timing requirements as recognized by those skilled in the art.

At block 124, configuration data is generated from the placed-and-routed circuit design. For example, bitstream generation tools may be executed on a processor to generate configuration data for an FPGA. At block 126, a programmable IC may be configured with the configuration data, thereby creating a circuit that operates according to the circuit design.

Figure 2:
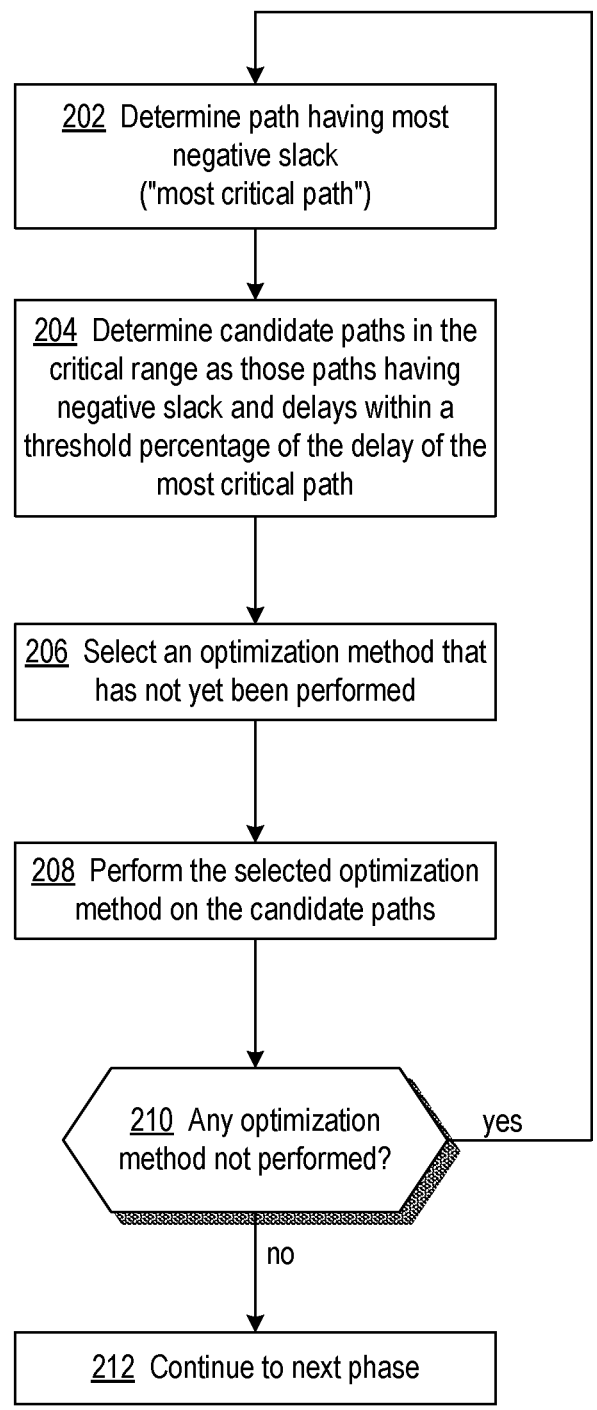
FIG. 2 shows a flowchart of a process of performing a first phase of optimizations on a placed, but un-routed, circuit design.

FIG. 2 shows a flowchart of a process of performing a first phase of optimizations on a placed, but un-routed, circuit design. The flowchart of FIG. 2 expands the description of the processing of blocks 108 and 110 of FIG. 1. At block 202, the processor determines the most critical path in the circuit design. The most critical path has the most negative slack, which is the least slack value that is negative. This slack value is often called Worst Negative Slack (WNS). At block 204, the processor determines candidate paths that are within a threshold percentage of the most critical path. For example, if the most critical path has a delay of 2 nanoseconds, and the threshold percentage is 20%, then the candidate paths include critical paths having delays of at least 1.6 nanoseconds. Specifically, if the most critical path delay is "WNSPathDelay," a critical path delay is "CritPathDelay," and the threshold percentage is TP %, then the path having the CritPathDelay is a candidate path if:

$$WNSPathDelay-CritPathDelay/WNSPathDelay*100\%<=TP$$

At block 206, the processor selects one optimization method from multiple optimization methods that are available and that has not yet been performed. For example, available optimization methods recognized by those skilled in the art may include "rewire," "fanout optimization," "LUT restructuring," "replacement," "retime," and "pin optimization" and other optimization methods.

For a given design, the optimization methods can be chosen in many different ways. One approach involves a fixed static order in which optimization A is attempted, then optimization B is attempted, followed by optimization C etc. In another approach, the optimization techniques can be attempted by analyzing design characteristics. A heuristic can identify the possible techniques that are very likely to improve the delay of a chosen critical path. Then, a dynamic ordering can be created and optimization techniques can be triggered in that order.

In rewire optimization, two of the same instances of a particular circuit structure drive different loads. For a first load driven by a first instance and a second load driven by a second instance, the first load may be rewired to be driven by the second instance and the second load may be rewired to be driven by the first instance.

In fanout optimization, a driver that fans out to a large number of loads may be replicated into multiple driver instances and the loads distributed amongst the replicated driver instances. This can be done to improve timing and reduce congestion.

In LUT restructuring optimization, the logic function, or a part thereof, implemented by serially connected LUTs may be combined and implemented in a larger LUT, which has more available input pins.

In replacement, circuit elements in a candidate path may be replaced at different locations in order to reduce the delay.

In retime optimization, the logic providing input to a flip-flop and the logic receiving output from the flip-flop may be restructured in an attempt to balance the number of logic levels In pin optimization, it is recognized that the pins of a LUT have different delays, and the connections of input signals to pins of a LUT are changed based on the delays of the input signals and delays of the LUT pins. Thus, the slowest/last arriving input signal may be reconnected to the fastest pin of the LUT and the fastest/first arriving input signal may be reconnected to the slowest pin of the LUT.

At block 208, the processor performs the selected optimization method on the group of candidate paths. It will be recognized that the selected optimization method may not be compatible with all the candidate paths. Thus, the selected optimization method is applied only to those candidate paths that have the circuit feature being optimized. For example, if the selected optimization method is high fanout, then the selected optimization method is performed on only those candidate paths having high fanout structures.

Decision block 210 determines whether or not there is another optimization method that has not yet been performed in the first phase. If so, the process continues at block 202 for another iteration. Otherwise, at block 212 the process continues to the second phase of processing.

Figure 3:
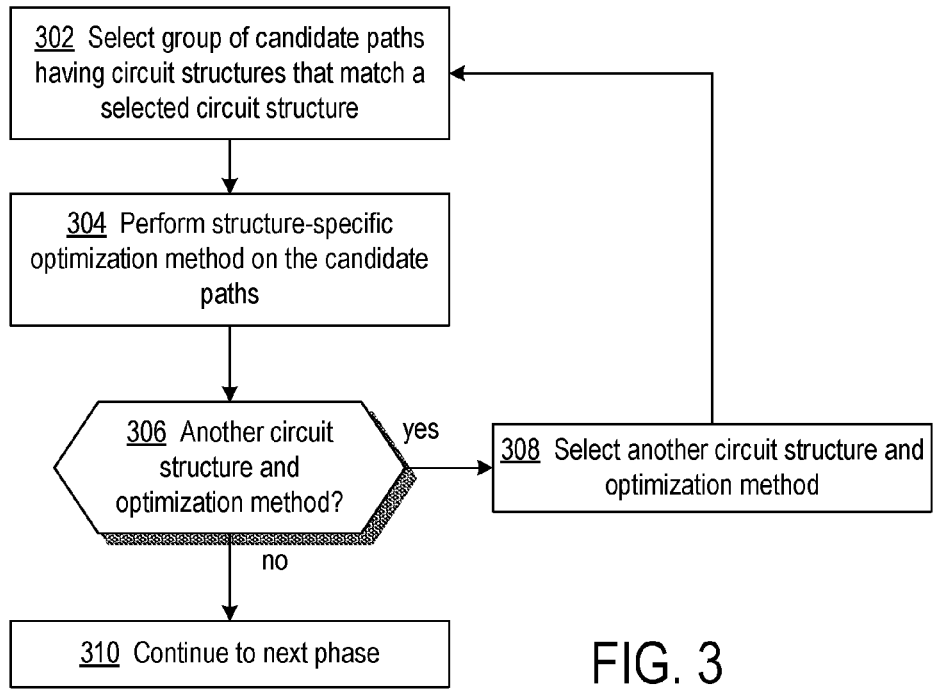
FIG. 3 shows a flowchart of a process of performing a second phase of optimizations on a placed, but un-routed, circuit design.

FIG. 3 shows a flowchart of a process of performing a second phase of optimizations on a placed, but un-routed, circuit design. In the second phase, the candidate paths need not be within the critical range of paths of circuit design as in the first phase. Rather, the candidate paths in the second phase are selected and optimized based on the circuit structures of the paths.

At block 302, a group of candidate paths is selected for optimization based on circuit structures of the paths matching a selected circuit structure, where the selected circuit structure is associated with the optimization method to be performed. Examples of such circuit structures include a driver having fanout greater than a threshold fanout value, a LUT-depth greater than a LUT-depth threshold, and a DSP or BRAM. The selected candidate paths are critical paths having a circuit structure that matches the selected circuit structure.

At block 304, the processor performs the optimization method associated with the circuit structure in the candidate paths. Optimizations of drivers having high fanout and paths having a high LUT depth are as described above. Optimization of paths having a DSP or BRAM entail moving a flip-flop(s) from a location proximate the DSP or BRAM to a location nearer a driver or load. DSPs and BRAMs have associated input and output flip-flops and may be selected from a library of logic cores and instantiated in a circuit design. As the DSPs and BRAMs are logic cores, the initial placement of the DSPs and BRAMs and associated input and output flip-flops may result in critical paths, which may be fixed by moving the input and output flip-flops associated with the DSPs and BRAMs.

After performing the optimization method on the candidate paths, decision block 306 determines whether or not there is another optimization method and circuit structure not yet used in the second phase. The circuit structure may belong to the same path-group (clock group) or to a different path-group. If there is another optimization method and circuit structure not yet used in the second phase, the processor selects an unused optimization method and circuit structure at block 308 and processing continues at block 302. Otherwise, processing continues with the third phase at block 310.

Figure 4:
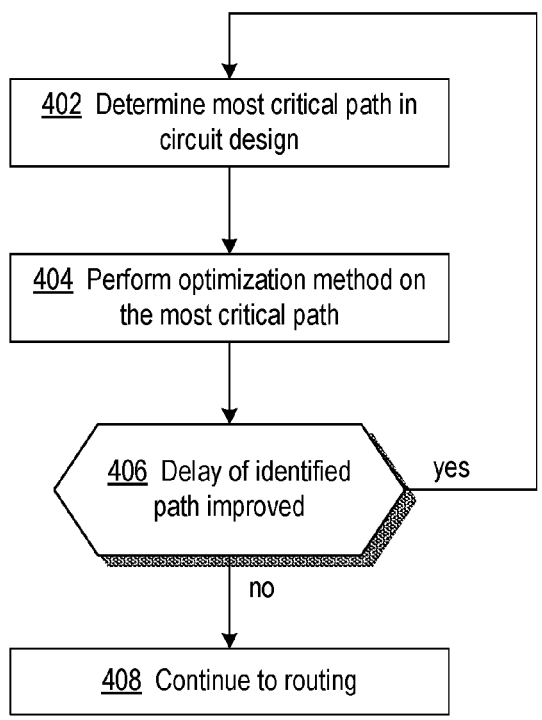
FIG. 4 shows a flowchart of a process of performing a third phase of optimizations on a placed, but un-routed, circuit design.

FIG. 4 shows a flowchart of a process of performing a third phase of optimizations on a placed, un-routed, circuit design. In the third phase, the process iteratively optimizes the most critical paths.

At block 402, the processor determines the most critical path in the circuit design, and at block 404 performs an optimization method on the most critical path. In one implementation, the optimization method is a greedy algorithm. At decision block 406, the processor determines whether or not the delay of the selected path was improved by the optimization method. If the delay was improved, the process continues at block 402. Otherwise, the process continues to routing the circuit design at block 408.

Figure 5:
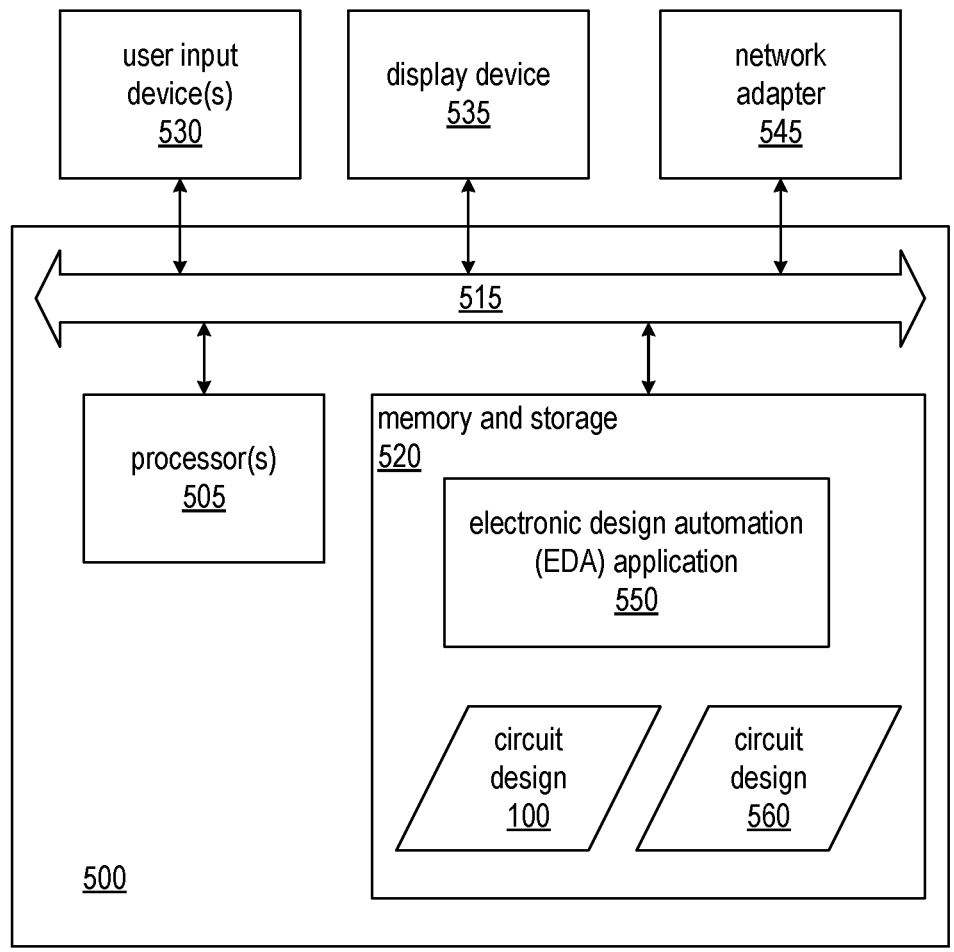
FIG. 5 is a block diagram illustrating an exemplary data processing system.

FIG. 5 is a block diagram illustrating an exemplary data processing system (system) 500. System 500 is an example of an EDA system. As pictured, system 500 includes at least one processor circuit (or "processor"), e.g., a central processing unit (CPU) 505 coupled to memory and storage arrangement 520 through a system bus 515 or other suitable circuitry. System 500 stores program code and circuit design 100 within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store an EDA application 550. EDA application 550, being implemented in the form of executable program code, is executed by processor(s) 505. As such, EDA application 550 is considered part of system 500. System 500, while executing EDA application 550, receives and operates on circuit design 100. In one aspect, system 500 performs a design flow on circuit design 100, and the design flow may include synthesis, mapping, placement, routing, and the application of one or more physical optimization techniques as described herein. System 500 generates an optimized, or modified, version of circuit design 100 as circuit design 560.

EDA application 550, circuit design 100, circuit design 560, and any data items used, generated, and/or operated upon by EDA application 550 are functional data structures that impart functionality when employed as part of system 500 or when such elements, including derivations and/or modifications thereof, are loaded into an IC such as a programmable IC causing implementation and/or configuration of a circuit design within the programmable IC.

Figure 6:
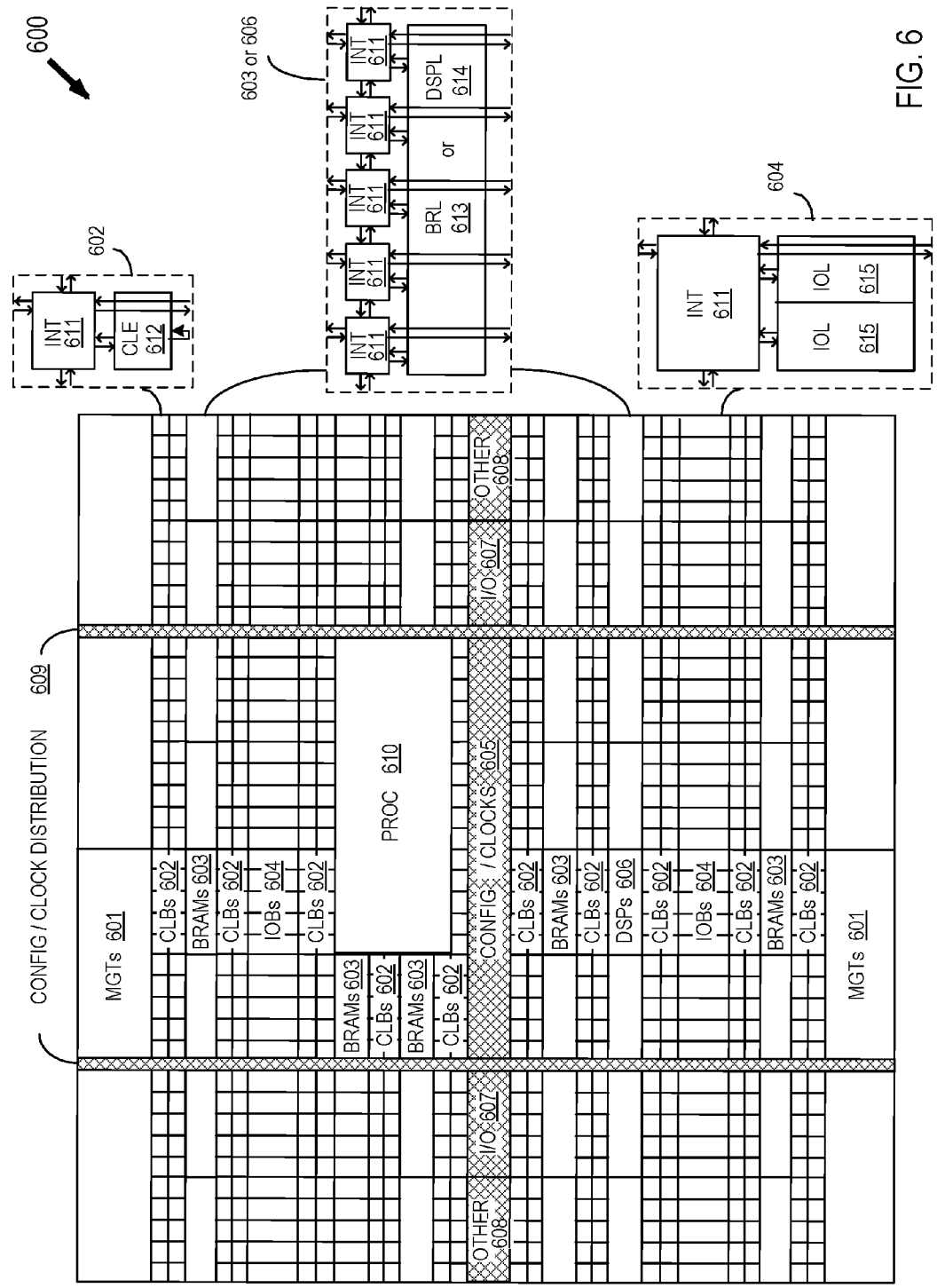
FIG. 6 shows a programmable integrated circuit (IC) on which a circuit design optimized according to the disclosed techniques may be implemented.

FIG. 6 shows a programmable integrated circuit (IC) 600 on which a circuit design, which has been optimized according to the disclosed techniques, may be implemented. The programmable IC may also be referred to as a System On Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL) 614 in addition to an appropriate number of programmable interconnect elements. An 10B 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for optimizing circuit designs. Other aspects and features will be apparent to those skilled in the art from consideration of the specification. It is intended that the specification and drawings be considered as examples only, with a true scope of the invention being indicated by the following claims.

What is claimed is:

1. A method of processing a circuit design, comprising:
performing operations by a processor that is coupled to a memory having the circuit design stored therein, the operations including:
synthesizing the circuit design and placing elements of the synthesized circuit design at locations on a target IC;
after the placing and before routing the circuit design, performing operations including:
determining respective delay values and slacks for paths in the circuit design;
determining a first path of the paths of the circuit design having a most negative slack based on the slacks of the paths;
selecting a first group of candidate paths from the paths of the circuit design, wherein the first group of candidate paths is a subset of critical paths of the circuit design, and the first group of candidate paths have delay values within a threshold range of delay values from the respective delay value of the first path;
modifying the first group of candidate paths to reduce the respective delay values of the first group of candidate paths;
selecting a second group of candidate paths from the paths of the circuit design, wherein the second group of candidate paths is a subset of paths of the circuit design having circuit structures that match selected circuit structures;
modifying the second group of candidate paths to reduce the respective delay values; and
iteratively selecting a critical path having a most negative slack and modifying the critical path to reduce the respective delay value until the respective delay value of the critical path in one iteration is greater than or equal to the respective delay value of the critical path in a next iteration.

2. The method of claim 1, wherein the modifying the first group of candidate paths includes applying a first optimization method to the first group of candidate paths and further comprising:
iteratively determining the first path, selecting the first group of candidate paths, and modifying the first group of candidate paths, and in each iteration, determining a new first path, selecting a new first group of candidate paths based on the new first path, and modifying the new first group of candidate paths using a different optimization method.

3. The method of claim 1, wherein the threshold range of delay values is within a threshold percentage of the respective delay value of the first path.

4. The method of claim 1, wherein:
the selecting the second group of candidate paths includes selecting paths that have respective fanouts greater than a threshold fanout; and
the modifying the second group of candidate paths includes performing fanout optimization on the second group of candidate paths.

5. The method of claim 1, wherein:
the selecting the second group of candidate paths includes selecting paths that include a number of sequentially connected lookup tables (LUTs) that is greater than a threshold number of LUTs; and
the modifying the second group of candidate paths includes performing LUT restructuring optimization on the second group of candidate paths.

6. The method of claim 1, wherein:
the selecting the second group of candidate paths includes selecting paths that include digital signal processors (DSPs); and
the modifying the second group of candidate paths includes moving flip-flops from areas of the DSPs to other areas of the target IC and moving flip-flops from other areas of the target IC to the areas of the DSPs.

7. The method of claim 1, wherein:
the selecting the second group of candidate paths includes selecting paths that include block RAMs (BRAMs); and
the modifying the second group of candidate paths includes moving flip-flops from areas of the BRAMs to other areas of the target IC and moving flip-flops from other areas of the target IC to the areas of the BRAMs.

8. The method of claim 1, wherein:
the selecting the second group of candidate paths includes selecting paths that include shift register logic (SRLs); and
the modifying the second group of candidate paths includes moving flip-flops from areas of the SRLs to other areas of the target IC and moving flip-flops from other areas of the target IC to the areas of the SRLs.

9. The method of claim 1, wherein:
the selecting the second group of candidate paths includes selecting paths that have two instances of a particular circuit structure driving different loads; and
the modifying the second group of candidate paths includes, for a first load driven by a first instance of the particular circuit structure and a second load driven by a second instance of the particular circuit structure, rewiring the second instance of the particular circuit structure to drive the first load and rewiring the first instance of the particular circuit structure to drive the second load.

10. The method of claim 1, wherein the selecting the second group of candidate paths is performed after the modifying of the first group of candidate paths, and the iteratively selecting a critical path having a greatest delay and modifying the critical path to reduce the respective delay value are performed after the modifying the second group of candidate paths.

11. The method of claim 1, wherein:
the modifying the critical path to reduce the respective delay value includes performing a greedy optimization technique on the critical path; and
the iteratively selecting and modifying the critical path are performed until the respective delay value cannot be reduced.

12. The method of claim 1, wherein the selecting the second group of candidate paths is performed after the modifying of the first group of candidate paths, and the iteratively selecting a critical path having a greatest delay and modifying the critical path to reduce the respective delay value are performed after the modifying the second group of candidate paths, and the method further comprising:
routing the circuit design after iteratively selecting the critical path and modifying the critical path.

13. The method of claim 12, wherein the target IC is a programmable IC, and the method further comprising:

generating configuration data after routing the circuit design; and
configuring a programmable IC with the configuration data to implement the circuit design on the programmable IC.

14. A method of processing a circuit design, comprising:
performing operations by a processor that is coupled to a memory having the circuit design stored therein, the operations including:
  synthesizing the circuit design and placing elements of the synthesized circuit design at locations on a target IC;
  after the placing and before routing the circuit design, performing physical synthesis operations including:
    determining respective delay values and slacks for paths in the circuit design;
    selecting a subset of the paths of the circuit design having a shared set of timing constraints;
    determining a first path of the paths having a most negative slack in the subset of paths based on the slacks of the paths;
    selecting a first group of candidate paths from the subset of paths, wherein the first group of candidate paths is a subset of the subset of paths of the circuit design, and the first group of candidate paths have delay values within a threshold range of delay values from the respective delay value of the first path;
    modifying the first group of candidate paths to reduce the respective delay values of the first group of candidate paths;
    selecting a second group of candidate paths from the subset of paths of the circuit design, wherein the second group of candidate paths is a subset of the subset of paths of the circuit design having circuit structures that match selected circuit structures;
    modifying the second group of candidate paths to reduce the respective delay values; and
    iteratively selecting a critical path having a most negative slack and modifying the critical path to reduce the respective delay value until the respective delay value of the critical path in one iteration is greater than or equal to the respective delay value of the critical path in a next iteration; and
  repeating the physical synthesis operations for different subsets of the paths of the circuit design having shared sets of timing constraints, respectively, until the physical synthesis operations have been performed for each different subset of the paths.

15. A system for processing a circuit design, comprising:
a processor;
a memory coupled to the processor and configured with instructions that when executed by the processor, cause the processor to perform operations including:
  synthesizing the circuit design and placing elements of the synthesized circuit design at locations on a target IC;
  after the placing and before routing the circuit design, performing operations including:
    determining respective delay values and slacks for paths in the circuit design;
    determining a first path of the paths of the circuit design having a most negative slack based on the slacks of the paths;
    selecting a first group of candidate paths from the paths of the circuit design, wherein the first group of candidate paths is a subset of critical paths of the circuit design, and the first group of candidate paths have delay values within a threshold range of delay values from the respective delay value of the first path;
    modifying the first group of candidate paths to reduce the respective delay values of the first group of candidate paths;
    selecting a second group of candidate paths from the paths of the circuit design, wherein the second group of candidate paths is a subset of paths of the circuit design having circuit structures that match selected circuit structures;
    modifying the second group of candidate paths to reduce the respective delay values; and
    iteratively selecting a critical path having a most negative slack and modifying the critical path to reduce the respective delay value until the respective delay value of the critical path in one iteration is greater than or equal to the respective delay value of the critical path in a next iteration.

16. The system of claim 15, wherein the instructions for modifying the first group of candidate paths include instructions for applying a first optimization method to the first group of candidate paths, and the memory configured with further instructions that when executed by the processor cause the processor to iteratively determine the first path, select the first group of candidate paths, and modify the first group of candidate paths, and in each iteration, determine a new first path, select a new first group of candidate paths based on the new first path, and modify the new first group of paths using a different optimization method.

17. The system of claim 15, wherein the instructions for selecting the second group of candidate paths cause the selecting to be performed after the instructions for modifying of the first group of candidate paths, and the instructions for iteratively selecting a critical path having a greatest delay and modifying the critical path to reduce the respective delay value cause the selecting and modifying to be performed after the modifying the second group of candidate paths.

18. The system of claim 15, wherein:
the instructions for modifying the critical path to reduce the respective delay value include instructions for performing a greedy optimization technique on the critical path; and
the instructions for iteratively selecting and modifying the critical path cause the iteratively selecting and modifying to be performed until the respective delay value cannot be reduced.

19. The system of claim 15, wherein the instructions for selecting the second group of candidate paths cause the selecting to be performed after the modifying of the first group of candidate paths, and the instructions for iteratively selecting a critical path having a greatest delay and modifying the critical path to reduce the respective delay value cause the iteratively selecting and modifying to be performed after the modifying of the second group of candidate paths, and the memory configured with further instructions that when executed by the processor cause the processor to route the circuit design after iteratively selecting the critical path and modifying the critical path.

20. The system of claim 19, wherein the target IC is a programmable IC, and the memory is configured with further instructions that when executed by the processor cause the processor to:
  generate configuration data after routing the circuit design; and configure a programmable IC with the configuration data to implement the circuit design on the programmable IC.

\* \* \* \* \*